Feb. 20, 1968  C. O. MERCKLE  3,370,121
RF ENERGY RETAINING RACEWAY FOR COMMUNICATIONS CABLES
Filed June 26, 1967

INVENTOR
CLAUDE O. MERCKLE
BY
ATTORNEY

United States Patent Office 3,370,121
Patented Feb. 20, 1968

3,370,121
RF ENERGY RETAINING RACEWAY FOR COMMUNICATIONS CABLES
Claude O. Merckle, Hagerstown, Md., assignor to The Danzer Metal Works Co., Inc., Hagerstown, Md., a corporation of Maryland
Continuation-in-part of application Ser. No. 441,149, Mar. 19, 1965. This application June 26, 1967, Ser. No. 648,891
5 Claims. (Cl. 174—35)

ABSTRACT OF THE DISCLOSURE

An RF energy retaining raceway for communications cables which includes trough-like raceway sections into which cables are laid and detachable covers for the raceway sections. A connector unit for adjacent raceway sections consists of a short trough-like member which interfits with the ends of the adjacent pair of raceway sections and has positive interlocking engagement therewith. A bridging element spans the top of the short trough-like member and provides a firm seat for opposed terminal end portions of the adjacent covers. Metallic RF energy retaining gasketing extends in a continuous band around the connector unit and between all covers and their underlying raceway sections.

Cross-reference to related application

This application is a continuation-in-part of my prior copending application Ser. No. 441,149, filed Mar. 19, 1965, for "Raceway for Electrical Cables and Wires Adapted to Retain RF Energy."

Background of the invention

As explained in said prior application, there is a need for an efficient RF energy retaining raceway of the type permitting cables to be conveniently laid into the same so as to permit ready access to the cables at all points along the raceway system. The critical element of such a raceway system is the connector joint between adjacent sections of the system and this joint most be constructed so as to be absolutely RF energy tight, while at the same time affording a sturdy mechanical connection between the raceway sections which can be separated when necessary.

The above needs are found lacking in the prior art to a great extent and are generally satisfied in the mentioned prior application. The general purpose of the invention herein is to provide a significant improvement over the construction in the prior application particularly concerning the connection or joint between adjacent raceway sections, rendering the assembling of the system more convenient and fool-proof and somewhat simplifying the manufacturing of parts due to the provision of parts which are uniform in construction and interchangeable.

Summary of the invention

The invention comprises an essentially U-shaped connector member having interfitting engagement with the ends of a pair of adjacent trough-like raceway sections. Separable fastener means positively retain the raceway sections and connector member in interlocking engagement. The raceway sections carry removable covers whose terminal ends overlie the connector member and span the same transversely. In accordance with the invention, a stiff bridging piece or channel spans the open top of the connector member and provides a firm seat for the metallic gasketing which extends transversely of the covers at their ends, enabling the cover constructions to be identical and interchangeable with no right or left hand or male and female non-interchangeable constructions of parts. The invention construction results in increased economy, reliability and ease of assembling by non-skilled personnel.

Description of the preferred embodiment

Figure 1:
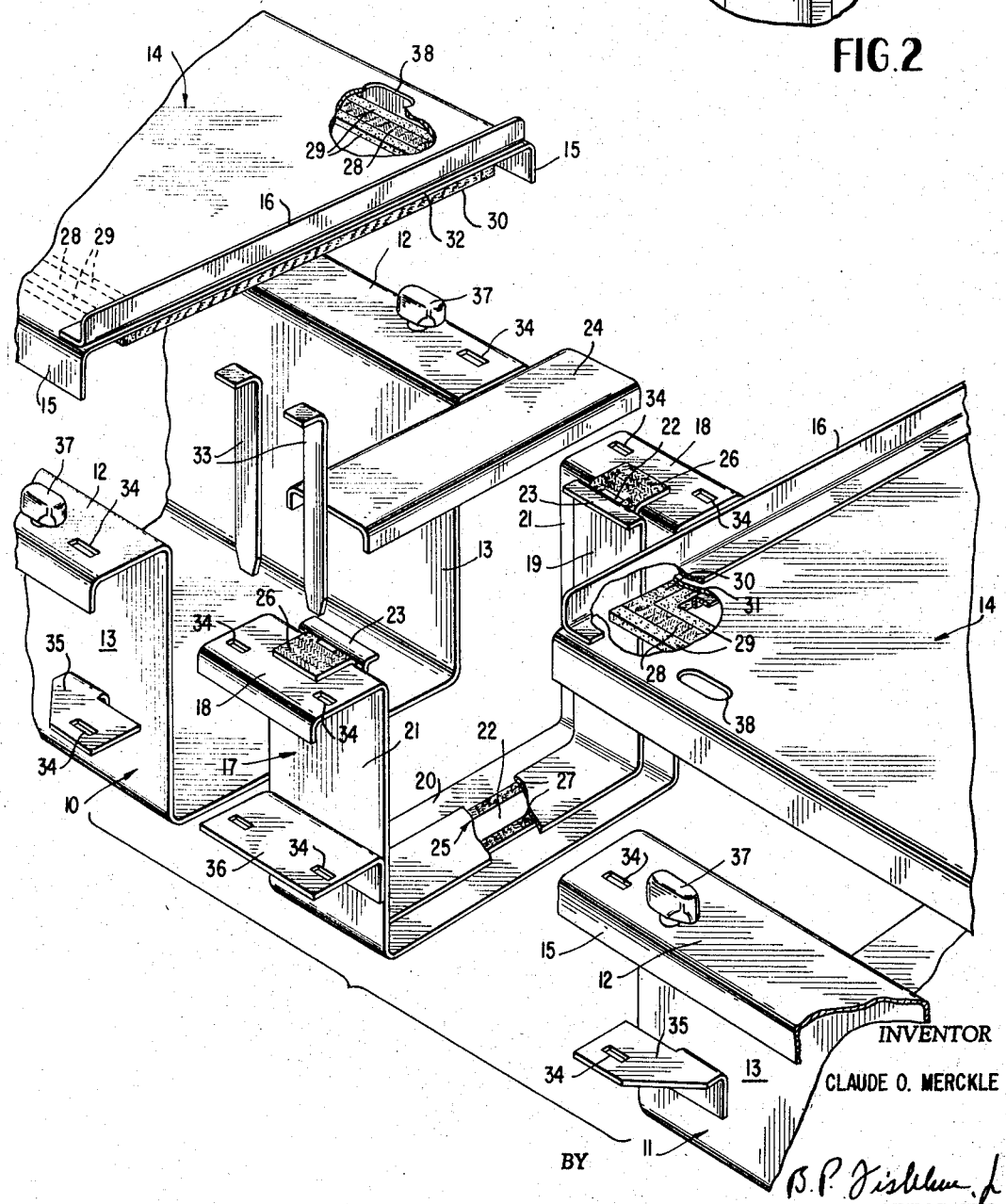
FIGURE 1 is an exploded perspective view of an improved communications cable raceway according to the invention.

In the drawings, wherein like numerals are employed to designate like parts, the numerals 10 and 11 designate a companion pair of generally U-shaped trough-like open-top raceway sections formed of sheet metal and constructed in accordance with the description in said prior application. Each raceway section includes a pair of side flat longitudinal cover mounting flanges 12 which project outwardly of the vertical side walls 13 of the raceway sections. Generally flat sheet metal covers 14 of identical and interchangeable construction are provided for the raceway sections and these covers are constructed generally in accordance with the teachings of said prior application and serve generally the same purpose in the invention, namely, for rendering the tops of the trough-like raceway sections RF energy tight and allowing easy access to the cables laid in the raceway system. However, a significant improvement over the corresponding covers for the raceway sections in the prior application resides in the fact that the opposing ends of the covers 14 are identical, thus eliminating right and left hand parts or male and female parts as was necessitated with the covers in the prior application. The covers 14 have downturned side stiffening flanges 15 formed integral therewith which lie outwardly of the mounting flanges 12 in assembly. Transverse angle braces 16 may also be welded across the opposing transverse ends of the covers 14 for increased rigidity and this arrangement was depicted and described in said prior application.

A short essentially U-shaped connector member 17 is provided for detachably joining the adjacent raceway sections 10 and 11 and this connector member has top outwardly extending side flanges 18 which underlie the flanges 12 in assembly. As disclosed in said prior application, the connector member 17 includes an interior relatively narrow U-shaped member 19 which extends continuously over the bottom wall 20 and vertical sides 21 of the connector member and is spaced equidistantly inwardly of the edges of the connector member, as shown. A still narrower U-shaped metallic spacer element 22 is intervened between the connector member 17 and the interior U-shaped member 19 and the three elements are rigidly connected by welding or the like, as described in said prior application. The spacer 22 also extends continuously over the bottom and sides of the connector member. At the top of the interior U-shaped member 19, a pair of short inwardly directed horizontal support flanges 23 are formed at the same elevation as the flanges 18 for the support of a transverse horizontal bridge piece or channel 24 whose ends rest upon the flanges 23 in assembly. These elements are all formed of metal. The elements 23 and 24 are not disclosed in said prior application and constitute important parts of the present invention enabling the ends of the covers 14 to be identically formed and eliminating the male and female cover ends of the prior application.

As fully explained in the prior application, the opposing ends of raceway sections 10 and 11 interfit telescopically with the connector 17, said ends of the raceway sections entering the cavities formed on opposite sides of the U-shaped spacer 22 and between the interior member 19 and the main exterior wall of the U-shaped connector.

Also, as fully disclosed in said prior application, a section of metallic gasketing such as knitted Monel metal gasketing indicated generally at 25 extends continuously between the interior U-shaped member 19 and the outer wall of connector 17. This gasketing has terminal end portions or pads 26 which lie upon the flanges 18 and the gasketing is divided longitudinally into branches 27 which extend continuously on opposite sides of the spacer element 22. The arrangement is such that the ends of raceway sections 10 and 11 will electrically contact the opposite edges of the gasketing 25 while within the cavities formed by the spacer element 22. This electrical contact is continuous along the U-shaped configuration of the connector and gasketing.

Figure 2:
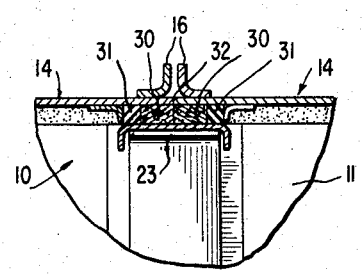
FIGURE 2 is a fragmentary longitudinal vertical section through the connection or joints between adjacent raceway sections.

Additionally, as shown in the drawings and in the prior application, each cover 14 has secured to its bottom face side longitudinal continuous metal gasket sections 28 and supporting boundary strips 29 of rubber-like material adhesively secured to the cover. The gasketing 28 contacts the flanges 12 in assembly and is compressed between these flanges and the rigid cover. The transverse ends of each cover also carry sections 30 of the same compressible metal gasketing and supporting strips or sections 31 of rubber-like material adhered to the cover 14. As shown in FIGURE 2, the metal gasketing sections 30 are adjacent the transverse edges 32 of the covers 14 and these gasketing sections abut and contact laterally in assembled relationship. Referring to FIGURE 2, the transverse gasketing sections 30 lie directly upon and electrically contact the rigid bridge piece 24 and are compressed against the same. The gasketing sections 30 extend for the full length of the bridge piece 24 and somewhat beyond the ends of the bridge piece so that end portions of the sections 30 will lie upon and electrically contact the terminal pads 26 in assembly, substantially as disclosed in said prior application. However, the provision of the bridge piece 24 and supporting flanges 23 constitutes a distinct improvement over the construction in the prior application where no such bridge piece was employed. In the prior arrangement, one of the covers 14 was required to carry a projecting extension or lip to engage under and support the transverse gasketing on the ends of each pair of covers at each raceway joint or connection. Consequently, the covers were not interchangeable and required male to female construction and engagement, whereas the present arrangement renders the covers identical and interchangeable and also provides a more reliable and rigid seat or support for the transverse cover gasketing sections 30.

Additionally, the bridge piece 24 is easily removable but cannot become displaced in any direction when the parts are assembled, as shown in FIGURE 2. In all other respects, the construction of the raceway may be identical to the construction disclosed in the prior application and it should not be necessary to redescribe the entire raceway system in detail herein because the essential improvement, as stated, resides in the provision of the bridging piece 24 and associated parts permitting the simplification and standardization of the raceway covers.

The parts are rigidly and detachably connected together in assembled relationship in exactly the same manner disclosed in the prior application. The several drive pins or connectors 33 engage through apertures 34 of the interfitting flanges 12 and 18 and underlying coacting bracket parts 35 and 36 carried by the sections 10 and 11 and the connector 17, respectively. The elements 33 and the apertures 34 lie entirely outside of the boundaries of the cover gasketing so as not to penetrate or interfere with the same and also outside of the ends of the bridge piece 24. The covers 14 are quickly releasably secured to their mounting flanges 12 by the same quarter-turn quick release fasteners 37, shown and described in said prior application. The raceway covers have slots 38 to receive the heads of the fasteners 37 and these slots and heads also lie outwardly of the metal gasketing on the bottom faces of the covers so that the action of the gasketing in retaining RF energy or preventing its escape from the raceway is not impaired. The fasteners 37 throughout the system cause firm and uniform compression of the metal gasketing along the opposite sides of the covers 14 and across their ends which overlap or overlie the rigid bridge pieces 24.

In light of the above, it is believed that the nature of the improvements may be fully understood with reference to the prior application and no further description or illustration should be required. It is also thought that the advantages of the improved connector or joint for the raceway system will be readily appreciated by those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In an RF energy retaining raceway for communications cables, a pair of raceway sections each being trough-like and having an open top, identical covers for the raceway sections and being substantially coextensive therewith, a connector connecting the opposed ends of said pair of raceway sections and being of like cross sectional shape with the raceway sections and having interfitting engagement with the ends of the raceway sections, a separate substantially rigid bridging piece spanning the connector transversely at its top, end portions of an adjacent pair of covers overlying the bridging piece and projecting beyond the opposed ends of the raceway sections, a section of metallic RF energy shielding gasketing on the connector and following the transverse cross sectional shape of the connector and being in electrical contact with the ends of the raceway sections substantially the full length of the section of gasketing, additional metallic RF energy shielding gasketing between the covers and raceway sections including transverse sections of gasketing extending across the covers at their ends and lying upon the bridging piece, releasable fastener means disposed outside of the gasketing and detachably securing the raceway sections and said connector in assembled relationship, and fastener means releasably securing the covers to the raceway sections.

2. In an RF energy retaining raceway for communications cables in accordance with claim 1, outwardly projecting side flanges on the raceway sections and connector, terminal pads of metallic RF energy shielding gasketing on the side flanges of the connector and constituting extensions of said section of gasketing on the connector and projecting beyond the opposite ends of the bridging piece, support elements for the bridging piece on the connector projecting inwardly of the side flanges of the connector, and said transverse sections of gasketing extending beyond the ends of the bridging piece and electrically contacting and lying upon said terminal pads.

3. In an RF energy retaining raceway for communications cables in accordance with claim 2, wherein said support elements for the bridging piece comprise short horizontal flanges disposed at the same elevation as the side flanges of the connector, and said bridging piece constituting a channel section including dependent side webs straddling the short flanges.

4. In an RF energy retaining raceway for communications cables in accordance with claim 1, and wherein said connector is substantially U-shaped and includes an outer wall and an interior wall which is narrower than the outer wall and spaced equidistantly inwardly from the edges of the outer wall, an intermediate U-shaped spacer element between the outer and interior walls and being substantially narrower than the interior wall and arranged near the lateral center of the interior wall, whereby cavities are provided between the outer and interior walls on opposite sides of the spacer element for the reception of the opposing ends of the raceway sections, said section of metallic gasketing on the connector being divided into branches disposed on opposite sides of the spacer element and terminating in horizontal pads at the top of the connector projecting outwardly of the outer wall of the connector, side flanges on the connector underlying said pads and supporting them, short inwardly extending flanges carried by the top of the interior wall substantially at the elevation of the side flanges, said rigid bridging piece having its ends resting upon and supported by said short flanges, said transverse sections of gasketing extending beyond the ends of the bridging piece and overlying said pads and being in electrical contact therewith.

5. In an RF energy retaining raceway for communications cables in accordance with claim 1, and wherein said transverse sections of gasketing extending across the covers at their ends have their outermost edges substantially registering with the end edges of the covers, whereby the end edges and transverse sections of gasketing substantially abut.

No references cited.

DARRELL L. CLAY, *Primary Examiner.*